US00RE46536E

(19) United States
(12) Reissued Patent
Chasen et al.

(10) Patent Number: US RE46,536 E
(45) Date of Reissued Patent: Sep. 5, 2017

(54) SYSTEM AND METHOD OF MANAGING METADATA DATA

(75) Inventors: Jeffrey M. Chasen, Redmond, WA (US); Christopher N. Wyman, Seattle, WA (US)

(73) Assignee: INTEL CORPORATION, Santa Clara, CA (US)

(21) Appl. No.: 12/547,341

(22) Filed: Aug. 25, 2009

Related U.S. Patent Documents

Reissue of:
(64) Patent No.: 6,760,721
Issued: Jul. 6, 2004
Appl. No.: 09/549,986
Filed: Apr. 14, 2000

U.S. Applications:
(62) Division of application No. 11/452,187, filed on Jun. 12, 2006, now Pat. No. Re. 42,101, which is an application for the reissue of Pat. No. 6,760,721.

(51) Int. Cl.
*G06F 17/30* (2006.01)

(52) U.S. Cl.
CPC .. *G06F 17/30286* (2013.01); *G06F 17/30595* (2013.01); *G06F 17/30864* (2013.01); *G06F 17/30867* (2013.01); *G06F 17/30038* (2013.01); *G06F 17/30772* (2013.01); *Y10S 707/99933* (2013.01); *Y10S 707/99935* (2013.01);

(Continued)

(58) Field of Classification Search
CPC ..... G06F 17/30864; G06F 17/30286; G06F 17/30716; G06F 17/30873; G06F 17/30991; G06F 17/30289; G06F 17/30994; G06F 17/30038; G06F 17/30489; G06F 17/30536; G06F 17/30749; G06F 17/30772; G06F 17/30958; G06F 17/30867; G06F 17/30595; Y10S 707/99944; Y10S 707/99933; Y10S 707/99945; Y10S 707/99935
USPC ..... 707/713, 803, 669, 802, 769, 770, 707/E17.005, E17.011, E17.014, E17.017, 707/661, 726, 805, 827, 913; 84/609; 709/219, 225, 229, 246
See application file for complete search history.

(56) References Cited

U.S. PATENT DOCUMENTS 4,744,281 A 5/1988 Isozaki
4,984,103 A * 1/1991 Nigam ..... 360/74.1
5,046,004 A 9/1991 Tsumura et al.

(Continued)

OTHER PUBLICATIONS

Office Action mailed Apr. 1, 2009 in U.S. Appl. No. 11/452,187, filed Jun. 12, 2006.

(Continued)

*Primary Examiner* — Jalatee Worjloh
(74) *Attorney, Agent, or Firm* — Stoel Rives LLP

(57) ABSTRACT

A system and method of the present invention allow users to access, manage, and edit information about content data, often referred to as metadata. Metadata is collected from various sources, added, and maintained in a metadata database. In addition, metadata is dynamically read from the metadata database and dynamically displayed in a graphical user interface in an organized manner, such as a hierarchical tree. In the graphical user interface, a user may add, delete, and/or modify the metadata. As the user changes the metadata, the metadata database is updated and the user's changes are propagated throughout the graphical user interface such that the hierarchical tree is displays the changed metadata.

18 Claims, 7 Drawing Sheets

(52) U.S. Cl.
CPC *Y10S 707/99944* (2013.01); *Y10S 707/99945* (2013.01)

(56) References Cited

U.S. PATENT DOCUMENTS

| | | | | | |
|---|---|---|---|---|---|
| 5,083,491 | A | | 1/1992 | Fields | |
| 5,142,961 | A | | 9/1992 | Paroutaud | |
| 5,153,829 | A | | 10/1992 | Furuya et al. | |
| 5,208,421 | A | | 5/1993 | Lisle et al. | |
| 5,247,126 | A | | 9/1993 | Okamura et al. | |
| 5,262,940 | A | | 11/1993 | Sussman | |
| 5,317,732 | A | | 5/1994 | Gerlach, Jr. et al. | |
| 5,388,264 | A | | 2/1995 | Tobias, II et al. | |
| 5,390,138 | A | | 2/1995 | Milne et al. | |
| 5,393,926 | A | | 2/1995 | Johnson | |
| 5,481,509 | A | * | 1/1996 | Knowles | 386/224 |
| 5,486,645 | A | | 1/1996 | Suh et al. | |
| 5,491,795 | A | | 2/1996 | Beaudet et al. | |
| 5,530,235 | A | * | 6/1996 | Stefik et al. | 235/492 |
| 5,559,548 | A | | 9/1996 | Davis et al. | |
| 5,590,319 | A | * | 12/1996 | Cohen et al. | 707/4 |
| 5,616,876 | A | | 4/1997 | Cluts | |
| 5,670,730 | A | * | 9/1997 | Grewe et al. | 84/609 |
| 5,717,925 | A | * | 2/1998 | Harper et al. | 707/102 |
| 5,721,911 | A | * | 2/1998 | Ha et al. | 707/100 |
| 5,739,451 | A | * | 4/1998 | Winksy et al. | 84/609 |
| 5,787,292 | A | * | 7/1998 | Ottesen et al. | 713/300 |
| 5,857,203 | A | * | 1/1999 | Kauffman et al. | 707/200 |
| 5,862,325 | A | | 1/1999 | Reed et al. | |
| 5,864,868 | A | | 1/1999 | Contois | |
| 5,870,710 | A | * | 2/1999 | Ozawa et al. | 704/500 |
| 5,914,941 | A | * | 6/1999 | Janky | 370/313 |
| 5,924,090 | A | * | 7/1999 | Krellenstein | 707/5 |
| 5,963,916 | A | * | 10/1999 | Kaplan | 705/7.29 |
| 6,028,605 | A | * | 2/2000 | Conrad et al. | 707/3 |
| 6,032,156 | A | * | 2/2000 | Marcus | 707/803 |
| 6,055,543 | A | * | 4/2000 | Christensen et al. | 707/104.1 |
| 6,061,692 | A | * | 5/2000 | Thomas et al. | 707/200 |
| 6,122,641 | A | * | 9/2000 | Williamson et al. | 707/103 R |
| 6,131,100 | A | * | 10/2000 | Zellweger | 707/104.1 |
| 6,163,781 | A | * | 12/2000 | Wess, Jr. | 707/103 X |
| 6,182,126 | B1 | * | 1/2001 | Nathan et al. | 725/134 |
| 6,199,059 | B1 | * | 3/2001 | Dahan et al. | 707/3 |
| 6,212,524 | B1 | * | 4/2001 | Weissman et al. | 707/101 |
| 6,240,407 | B1 | * | 5/2001 | Chang et al. | 707/2 |
| 6,243,725 | B1 | * | 6/2001 | Hempleman et al. | 715/210 |
| 6,256,031 | B1 | * | 7/2001 | Meijer et al. | 707/203 |
| 6,263,341 | B1 | * | 7/2001 | Smiley | 707/103 R |
| 6,269,394 | B1 | * | 7/2001 | Kenner et al. | 709/217 |
| 6,282,548 | B1 | * | 8/2001 | Burner et al. | 707/104.1 |
| 6,310,848 | B1 | * | 10/2001 | Ueki | 369/53.37 |
| 6,311,194 | B1 | * | 10/2001 | Sheth et al. | 707/505 |
| 6,317,761 | B1 | | 11/2001 | Landsman et al. | |
| 6,363,377 | B1 | * | 3/2002 | Kravets et al. | 707/4 |
| 6,389,426 | B1 | * | 5/2002 | Turnbull et al. | 707/102 |
| 6,405,215 | B1 | * | 6/2002 | Yaung | 707/104.1 |
| 6,430,575 | B1 | * | 8/2002 | Dourish et al. | 707/200 |
| 6,449,341 | B1 | * | 9/2002 | Adams et al. | 379/9 |
| 6,452,609 | B1 | * | 9/2002 | Katinsky et al. | 715/716 |
| 6,760,721 | B1 | | 7/2004 | Chasen et al. | |
| 6,928,433 | B2 | * | 8/2005 | Goodman et al. | 707/713 |
| 6,976,229 | B1 | * | 12/2005 | Balabanovic et al. | 715/838 |
| 6,981,040 | B1 | | 12/2005 | Konig et al. | |
| RE42,101 | E | | 2/2011 | Chasen et al. | |
| 2001/0008471 | A1 | * | 7/2001 | Naohara et al. | 360/15 |
| 2002/0045960 | A1 | * | 4/2002 | Phillips et al. | 700/94 |

OTHER PUBLICATIONS

Notice of Allowance mailed Aug. 16, 2010 in U.S. Appl. No. 11/452,187, filed Jun. 12, 2006.

Office Action mailed Oct. 24, 2002 in U.S. Appl. No. 09/549,986, filed Apr. 14, 2000.

Office Action mailed May 21, 2003 in U.S. Appl. No. 09/549,986, filed Apr. 14, 2000.

Office Action mailed Dec. 4, 2003 in U.S. Appl. No. 09/549,986, filed Apr. 14, 2000.

Notice of Allowance mailed Mar. 23, 2004 in U.S. Appl. No. 09/549,986, filed Apr. 14, 2000.

SupaNova MP3 Explorer, The best way to organise your MP3 files just got better!, web page at http://www.millstone.demon.co.uk/download/mp3exp.htm, as available via the Internet and printed May 29, 2006 (2 pgs.).

Waugh, Andrew, Article entitled "Specifying metadata standards for metadata tool configuration", Published by Elsevier Science B.V. 1998, Computer Networks and ISDN Systems 30, pp. 23-32.

Beard, M. Kate, et al., Article entitled "Multilevel and Graphical Views of Metadata", IEEE, Downloaded Jan. 16, 2010, pp. 1-10.

Beard, et al., "Multilevel and Graphical Views of Metadata," *Research and Technology Advances in Digital Libraries*, pp. 256-265, 1998.

Pachet, et al., "A Combinatorial Approach to Content-based Music Selection," *Multimedia Computing and Systems*, pp. 457-462, Jun. 7, 1999.

Wold, et al., "Content-Based Classification, Search, and Retrieval of Audio," *IEEE Multimedia, IEEE Computer Society*, vol. 3, pp. 27-36, 1996.

* cited by examiner

SYSTEM AND METHOD OF MANAGING METADATA DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 6,760,721. The reissue applications are U.S. patent application Ser. No. 11/452,187, which was filed on Jun. 12, 2006, and U.S. patent application Ser. No. 12/547,341 (the present application), which was filed on Aug. 25, 2009 and is a divisional of U.S. patent application Ser. No. 11/452,187. Accordingly, the present application is a divisional reissue application of U.S. Pat. No. 6,760,721.*

FIELD OF THE INVENTION

The system and method of the present invention relate generally to the field of managing metadata.

BACKGROUND

The increased reliance on digital data has led to a need for detailed information about the digital data as well as techniques for managing and controlling this detailed information. This detailed information is known as "metadata." For example, there is a high demand for audio data, and accordingly, there is a high demand for metadata about the audio data such as, for example, the artist or speaker name, album name, genre, number of songs, and so forth.

While access to metadata provides the public with a vast amount of information, it is often difficult to manage the metadata. For example, keeping track of various audio files as well as the immense amount of metadata for each audio file can be a difficult task.

One common problem is that conventional approaches do not allow the user to easily view and access the metadata. For example, it is typical for a user to have hundreds or even thousands of audio files making it difficult for the user to sift through each file of metadata. A user may have to look through hundreds or through thousands of files to find the desired file.

Another common problem is that conventional approaches fail to provide users with control over the metadata such as the ability to make changes to a piece of metadata or a set of metadata. For example, a user may want to alter the genre of an audio file by changing the genre from Jazz to New Age.

SUMMARY OF THE INVENTION

In one embodiment, the present invention is a method for dynamically organizing metadata located in a database of metadata for presentation to a user in a display. The method comprises receiving a plurality of categories of metadata wherein the plurality of categories of metadata represent a hierarchical representation of the metadata; querying a database of metadata to produce a set of metadata query results; arranging the metadata query results in a hierarchical representation of metadata based at least upon a subset of the plurality of categories; and presenting the hierarchical representation of metadata to a user in a graphical display.

Another embodiment of the present invention is a method of dynamically updating a display of metadata to a user. The method comprises storing metadata in a database; displaying a hierarchical representation of a subset of the metadata to a user; receiving a change to at least a portion of the subset of metadata displayed to the user; processing the change to update the corresponding portion of the subset of metadata in the metadata database; determining which portions of the hierarchical representation are affected by the change; updating the portions of the hierarchical representations affected by the change; and displaying the updated hierarchical representation to the user.

Another embodiment of the present invention is a metadata management system used to access, manage, and edit information about content data. The metadata management system comprises a metadata database that includes information about content data; a metadata management module used to access the information about content data in the metadata database; and a graphical user interface configured to communicate with the metadata management module, to dynamically access the information about content data in the metadata database, and to dynamically present an organized grouping of at least a portion of the information about content data for display to a user.

Another embodiment of the present invention is a method for presenting metadata in a database. The method comprises obtaining a hierarchy of category nodes; querying the database for a set of metadata; dynamically arranging the set of metadata in the hierarchy of category nodes; and presenting the set of metadata in the hierarchy of category nodes to a user.

Another embodiment of the present invention is a method for presenting metadata in a database. The method comprises displaying a set of metadata from a metadata database in a hierarchy of category nodes; receiving a change to a portion of the set of metadata; and dynamically updating the display of the set of metadata and the hierarchy of category nodes to reflect the change.

Another embodiment of the present invention is a method for dynamically presenting metadata in a hierarchical form. The method comprises executing a search on a database, to obtain a set of search results, wherein the database stores metadata; receiving a set of user preferences for viewing the search results wherein the user preferences are based on properties of the metadata; dynamically generating a tree structure based on the search results and the set of user preferences; dynamically determining a layout of the tree structure; dynamically mapping the search results onto the tree structure based on the layout; and dynamically displaying the tree structure.

Another embodiment of the present invention is a method of obtaining information about content data wherein information about content data is stored in a database and displayed in a graphical user interface using a standard data structure. The method comprises obtaining an identifier related to a set of content data; creating a request for information about the set of content data using the identifier; processing the request for information; receiving a set of request information in response to the request for information; and storing the set of request information a database.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION

Figure 1:
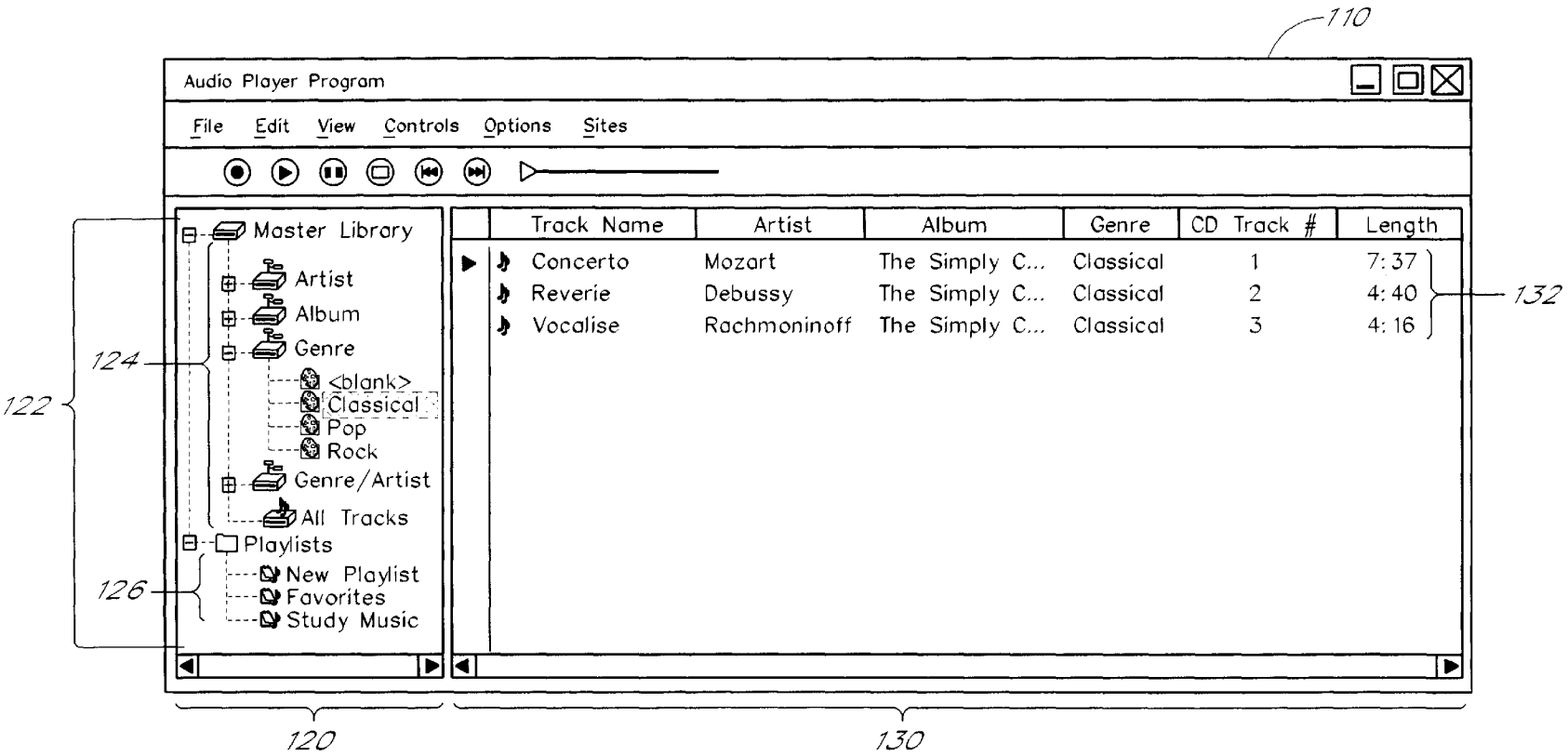
FIG. 1 illustrates an example display from one embodiment of the present invention.

A system and method which represent one embodiment and example application of the invention will now be described with reference to the drawings. Variations to the system and method which represent other embodiments will also be described. In one disclosed embodiment, the system and method are used to dynamically represent audio metadata using a master tree and a node table. It will be recognized, however, that other embodiments may use only one of these two types of data structures and/or different types of data structures to help users organize and access data. In addition, other types of data may also be used.

For purposes of illustration, one embodiment will be described in the context of a master tree and node table for organizing and accessing audio metadata and audio data within an audio playing device such as, for example, RealJukebox™. While the inventors contemplate that the present invention is not limited by the type of content data and/or metadata to be managed and that the types of data may include video, audio, audio-visual, slideshow, image and text, and so forth, the figures and descriptions relate to an embodiment of the invention using audio metadata and audio content data. Furthermore, the details of the master tree, node table, and of specific implementations are set forth in order to illustrate, and not to limit, the invention. The scope of the invention is defined by the appended claims.

These and other features will now be described with reference to the drawings summarized above. The drawings and the associated descriptions are provided to illustrate embodiments of the invention, and not to limit the scope of the invention. Throughout the drawings, reference numbers are re-used to indicate correspondence between referenced elements. In addition, the first digit of each reference number indicates the figure in which the element first appears.

I. Overview

Audio metadata, such as track name, artist, album, genre, track number, length, and so forth, is collected from various sources, added, and maintained in a metadata database. A metadata management module dynamically reads metadata from the metadata database, organizes the metadata into groupings using a groupings tree, combines the groupings tree with other trees to form a master tree, combines metadata relating to the selected grouping into a node table, and presents the master tree and the node table in a graphical user interface. In the graphical user interface, a user may add, delete, and/or modify the metadata in the master tree and/or the node table. As the user changes the metadata, the metadata database is updated and the user's changes are propagated throughout the graphical user interface. The user may also use the master tree and the node table to begin playing an audio file and/or a set of audio files.

The top node of the master tree represents a root node. The next level of the master tree represents root nodes of subtrees such as the groupings tree and the playlist tree. The lowest-level nodes of the master tree represent audio metadata of individual audio tracks, while the other nodes represent groupings (or sub-groupings) of audio tracks. This relationship structure allows the master tree to include various types of trees. For example, the groupings tree provides ways to group and categorize audio metadata, such as, for example, by Album, Artist, Genre, and so forth as well as by nested groupings such as, for example, Artist/Album, Genre/Artist, Genre/Artist/Album, and so forth. The groupings may be based upon fields of the metadata database as well as other groupings, categories, and/or preferences created by the user, hard-coded into the system, and so forth. The playlist tree provides ways to create or provide ordered lists of audio tracks.

The master tree and the node table are dynamically populated and displayed to the user. In addition, when a user makes any changes to the master tree and/or the metadata in the node table, both the master tree and the node table may be dynamically updated. In one embodiment, the master tree and the node table are dynamically updated without having to rebuild the entire master tree and the entire node table. Instead, the changes may be propagated throughout the master tree and node table through the use of a node location table that tracks the locations of the node within the master tree.

One benefit of this embodiment is that the metadata management system can read metadata from the metadata database and dynamically organize the metadata for display in the graphical user interface. Thus the metadata can be stored in a basic format and still presented to the user in an accessible format without requiring extensive or time consuming processing of the metadata.

Another benefit of this embodiment is that the user is given access to the metadata to make additions, changes, and/or deletions through an easy to use graphical user interface. Using the graphical user interface, the user has access to the data through interface tools such as, for example, menus, windows, pointing devices, drag and drop features, and so forth. For example, rather than having to manually edit each piece of the metadata, the user can use the interface tools to add data, move data into new categories and/or groupings, and so forth.

An additional benefit of this embodiment is that the metadata information may be displayed in the graphical user interface using organizational techniques. Rather than having to traverse vast amounts of metadata to find a particular record, the user is instead presented with an organized view of the metadata. This embodiment allows the metadata to be presented in a variety of categories using a variety of subtrees. The user may create custom categories as well as custom subtrees affording much flexibility and user control. For example, one user may create groupings for the Genres Rock and Jazz, while another user may create groupings for the Artists Styx and Abba. In addition, one user may group data into categories that are often used such as Artist/Genre/Album, while another user may create customized playlists.

A further benefit of this embodiment is the ability to dynamically update the data in the database collection as well as the data displayed in the graphical user interface. Thus, when users make changes to the metadata and/or the groupings or categories, the changes are made in the database and propagated throughout the graphical user interface such that the user is seeing an accurate representation of the metadata database. The user can view changed data without having to reread all of the data and regenerate the entire display. Instead, this embodiment provides fast, dynamic updating of the view of the data within the graphical user interface without causing much delay and/or inconvenience to the user.

Another benefit of this embodiment is that the user can update multiple sets of metadata with simple changes in the graphical user interface. For example, if a user has one thousand files with the genre value as Pop and the user wants to change the genre to Rock, the user can rename the genre grouping from Pop to Rock and all of the nodes within that genre grouping may be updated to reflect the genre value change. This feature saves the user from having to manually edit each of the metadata files one-by-one.

An additional benefit of this embodiment is that the user may update the metadata located in the individual content data files with the current metadata in the metadata database. For example, a user may select a command wherein the data within the metadata database is then copied to the appropriate MP3 header file that includes the metadata. For example, if a user changes the Genre of an audiofile from Rock to Pop in the graphical user interface and then executes an update MP3 file command, then the user's MP3 file will also automatically be updated such that the Genre is changed from Rock to Pop in the MP3 file.

II. Sample Display

FIG. 1 illustrates an example program display of a graphical user interface. In FIG. 1, an audio player program display 110 includes two windows, a tree window 120 that includes a master tree 122, with an example groupings tree 124 and an example playlist tree 126, and a table window 130 that includes a node table 132 with an example set of audio metadata.

The tree window 120 displays the master tree 122. In the exemplary master tree 122, there are two subtrees, Master Library 124 and Playlists 126. The Master Library subtree 124 represents a groupings tree and illustrates ways to group or categorize the audio metadata in the metadata database. The Master Library subtree's 124 grouping includes five groupings, Artist, Album, Genre, Genre/Artist, and All Tracks. Furthermore, the Genre grouping includes four sub-groupings, <blank>, Classical, Pop, and Rock. The Playlists subtree 126 provides ways to group or categorize the audio metadata into custom playlists, (i.e., lists of tracks that the user wants played in a specific order). Users can create custom playlists indicating the order in which the user would like to listen to the audio files. The Playlists subtree 126 includes three playlists, New Playlist, Favorites, and Study Music.

The table window 130 displays a node table 132 that includes information about the node that is selected in the tree window 120. This information includes details about the audio tracks that fall within the selected node. A user may display a node table 132 by selecting a grouping such as, for example, by using a mouse to click on the desired node in the tree window 120. Other methods of selecting a grouping are discussed below.

In FIG. 1, the Master Library→Genre→Classical grouping was selected, and thus, the metadata for audio tracks that have the value "Classical" in the Genre field in the database are displayed as audio track records in the node table 132 within the table window 130. In the exemplary table window 130, three audio track records are shown: Concerto by Mozart, Reverie by Debussy, and Vocalise by Rachmaninoff. In one embodiment, the user may begin playing the audio file of a track record by selecting an audio track for playback such as, for example, by using a mouse to double click on any field of the audio track record in the node table 132. Other methods of selecting an audio track record for playback are discussed below. In another example, the user may select a higher level node, such as the Genre node located under the Master Library→Genre grouping. The node table 132 may then display the sub-groupings of the Genre node such as, for example, <blank>, Classical, Pop, and Rock, as well as collective information about the tracks within the sub-groupings such as, for example, the total number of tracks, total length, and total size.

III. The Metadata Management System

Figure 2:
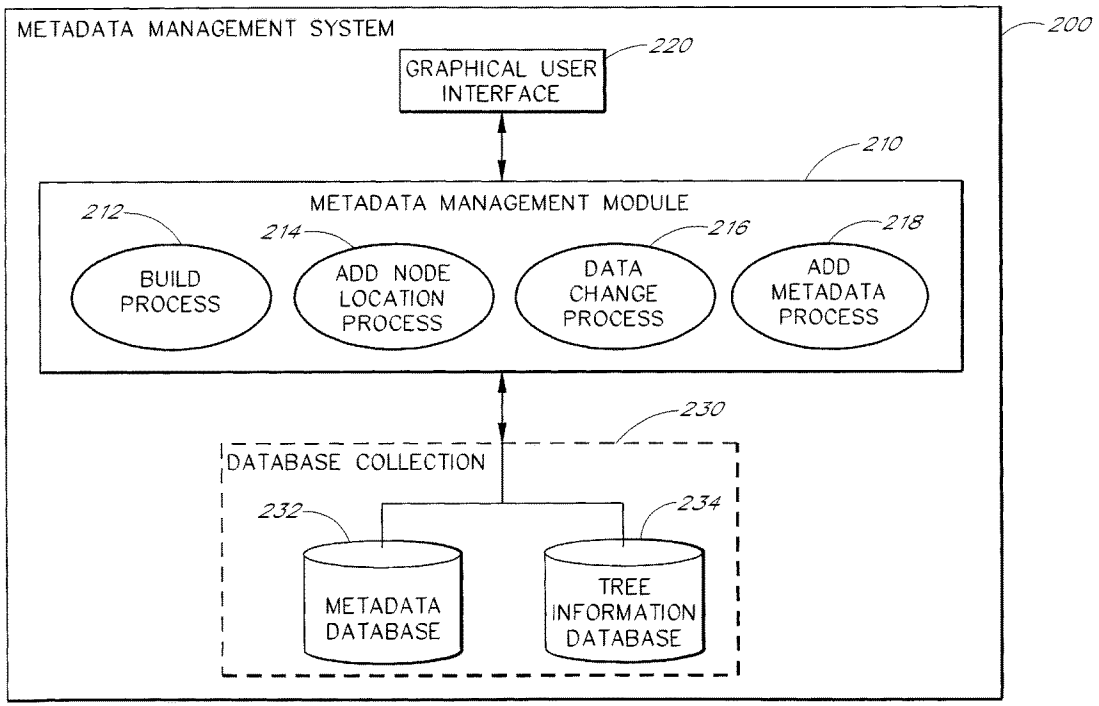
FIG. 2 illustrates a high-level block diagram of one embodiment of the present invention.

FIG. 2 represents an overview of one embodiment of a metadata management system 200. In one embodiment, the metadata management system 200 manages descriptive data, herein after referred to as metadata, about content data. For example, if the content data is a set of audio files, the corresponding metadata may include information about the audio files such as, for example, the album, artist or speaker, genre, the unique identifying characteristic of a track, and so forth. In another embodiment, the content data may be a set of video files, and the corresponding metadata may include information about the video files such as, for example, the genre, video length, leading actors, parent advisory rating, and so forth. It is recognized that in other embodiments, the metadata management system 200 may manage other types of content data and/or metadata.

In FIG. 2, the metadata management system 200 includes a metadata management module 210 that communicates with a graphical user interface 220 and a database collection 230. The metadata management module 210 includes a build process 212, an add node location process 214, a data change process 216, and an add metadata process 218. Furthermore, the database collection 230 includes a metadata database 232 as well as a tree information database 234.

As used herein, the word module, whether in upper or lower case letters, refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

In one embodiment, the metadata management system 200 is implemented on a user computer (not shown). The user computer is a device which allows a user to access the content data and/or the metadata. While the term user computer is used, it is recognized that in other embodiments, the metadata management system 200 may be implemented on other systems such as, for example, a portable computing device, a portable audio player, a portable video player, a server, a computer workstation, a local area network of individual computers, an interactive television, an interactive kiosk, a personal digital assistant, an interactive wireless communications device, a handheld computer, a telephone, a router, a satellite, a smart card, an embedded computing device, or the like.

In one embodiment, the user computer is a conventional, general purpose computer using one or more microprocessors, such as, for example, a Pentium processor, a Pentium II processor, a Pentium Pro processor, an xx86 processor, an 8051 processor, a MIPS processor, a Power PC processor, or an Alpha processor. In one embodiment, the user computer runs an appropriate operating system, such as, for example, Microsoft® Windows® 3.X, Microsoft® Windows 98, Microsoft® Windows® NT, Microsoft® Windows® CE, Palm Pilot OS, Apple® MacOS®, Disk Operating System (DOS), UNIX, Linux®, or IBM® OS/2® operating systems.

In one embodiment, the metadata management system 200 includes or is connected to a player module (not shown). For example, the metadata management system 200 may include an audio player, a video player, and so forth such that a user may access the content data as well as the metadata using the graphical user interface 220.

A. Metadata Management Module

In one embodiment, the metadata management system 200 includes a metadata management module 210. As indicated above, the metadata management module 210 communicates with the graphical user interface 220 and the database collection 230.

The metadata management module 210 works in concert with the graphical user interface 220 to build the master tree 122 displayed in the tree window 120 and the node table 132 displayed in the table window 130. The metadata management module 210 may be requested to build the master tree 122 and the node table 132 upon the occurrence of several events such as, for example, upon user request (e.g., selecting the "refresh" button or via a menu option), upon an automatic request when the audio player program is opened, and so forth. In other embodiments, the metadata management module 210 may generate a portion of or the entire master tree 122 and/or the node table 132 off-line.

As indicated above, in one embodiment, the metadata management module 210 may generate several types of trees (sometimes referred to as subtrees) and combine the trees into a master tree 122 for display in the tree window 120. The metadata management module 210 may combine the trees by creating a root node and attaching the various trees as children of the root node. It is recognized that the various trees may be combined in other manners that are well known to those skilled in the art. Furthermore, in other embodiments, the audio data tree may represent a combination of several types of trees and/or a single type of tree.

In one embodiment, the metadata management module 210 may also generate the node table 132 for display in the table window 130. As discussed above, the node table 132 displays additional information about the selected grouping. In one embodiment, a default selected grouping may be stored in the tree information database 234 wherein the default selected grouping may be based on one or more factors such as, for example, the last grouping that the user selected, the most popular grouping that has been selected, a pre-selected grouping, and so forth. To build the node table 132, the metadata management module 210, queries the metadata database 232 for records that fall within the selected grouping. In one embodiment, if the selected node is a leaf node, the node table 132 may display metadata pertaining to the audio tracks that fall within the selected grouping. If the selected node is a non-leaf node, the node table 132 may display collective information about the tracks within the sub-groupings of the selected grouping. For more information on the node table 132, see the section below entitled Graphical User Interface—Node Table.

The metadata management module 210 illustrated in FIG. 2 includes a build process 212, an add node location process 214, a data change process 216, and an add metadata process 218. For more information on these process, see the section below entitled Metadata Management Module Processes. The metadata management module 210 may include other processes (not shown) such as, for example, a process for combining one or more grouping trees into a groupings tree 124, combining one or more trees (e.g., groupings tree 124, playlist tree 126, etc.) into a master tree 122, and so forth.

B. Graphical User Interface

In one embodiment, the metadata management system 200 includes a graphical user interface 220 ("GUI"). The GUI 220 in FIG. 2 presents information to the user such as the content data and metadata. The GUI 220 may also allow the user to view the data, change the view of the data, access data (e.g., for playback), modify data, delete data, and/or add new data to the database collection 230.

The GUI 220 may be implemented as a module that uses text, graphics, audio, video, and other media to present data and to allow interaction with the data. The GUI 220 may be implemented as a combination of an all points addressable display such as a cathode-ray tube (CRT), a liquid crystal display (LCD), a plasma display, or other types and/or combinations of displays; input devices such as, for examples, a mouse, trackball, touch screen, pen, keyboard, voice recognition module, and so forth; and software with the appropriate interfaces which allow a user to access data through the use of stylized screen elements such as, for example, menus, windows, dialog boxes, toolbars, controls (e.g., radio buttons, check boxes, sliding scales, etc.), and so forth.

As illustrated in FIG. 1, in one embodiment, the GUI 220 may display a master tree 122 in the tree window 120 and a node table 132 in the table window 130.

1. Master Tree

As indicated above, the master tree 122 provides various ways to group and categorize audio data. In one embodiment, the master tree 122 displays nodes that have at least one child (non-leaf nodes) such that the leaf nodes are not displayed in the master tree 122, but are instead displayed in a table format in the node table 132. It is recognized that in other embodiments, the leaf nodes as well as the non-leaf nodes may be displayed in the master tree 122. In addition, the GUI 220 allows the user to expand a subtree of the master tree 122 in order to view the subtrees children.

The master tree 122 is preferably in the form of a directed acyclic graph (a tree that allows a child node to have multiple parents). While this embodiment uses an acyclic graph representation, it is recognized that in other embodiments, other types of graphs or trees may be used such as, for example, B* trees, optical trees, binary trees, n-way trees, balanced trees, min-max trees, Huffinan trees, splay trees, AVL trees, and so forth. Furthermore, other data structures, such as, for example, files, lists, arrays, records, tables, and so forth, or a combination of data structures may be used.

2. Node Table

As indicated above, the node table 132 displays additional information about the node that is selected in the master tree 122. In one embodiment, if the selected node is a leaf node, the node table 132 may display metadata pertaining to the audio tracks that fall within the grouping as audio track records. The node table 132 in FIG. 1 includes the fields Track Name, Artist, Album, Genre, CD Track #, and Length and is arranged in a standard table format wherein the rows represent audio track records and the columns represent categories or attributes of data within the metadata database 232. If the selected node is a non-leaf node, the node table 132 may display collective information about the tracks within the sub-groupings of the selected node such as, for example, the total number of tracks, total length, and total size. For example, if the selected node is Artist under the grouping Master Library→Artist, the node table 132 may then display the sub-groupings of the Artist node such as, for example, Debussy, Mozart, and Rachmaninoff, as well as the total number of tracks, total length, and total size of audio files data for each artist.

It is recognized that in other embodiments different categories, attributes, and/or collective information may be used that include fewer fields of the metadata database 232, additional fields of the metadata database 232, user customized categories, as well as other categories. In addition, some or all of the exemplary categories or attributes may be omitted from the node table 132.

The node table 132 is preferably in the form of a standard table wherein data is arranged in rows and columns such that multiple audio track records are visible in the table window 130. It is recognized that other formats may be used. For example, the table window 130 may display individual records, a tree of records, a linked list of records, and so forth. It is recognized that in other embodiments, other types of data structures such as, for example, trees, files, lists, arrays, records, and so forth, or a combination of data structures may be used.

C. Database Collection

In one embodiment, the metadata management system 200 includes a database collection 230. The database collection 230 in FIG. 2 includes a metadata database 232 and a tree information database 234.

1. Metadata Database

The metadata database 232 includes metadata about the audio content data. The metadata may include information such as track name, artist, album, genre, CD track number, length, format, quality, comments, date and/or time last played, date and/or time the track was created, file size, file location, protection flag, as well as other types of information related to the audio file. The metadata may include fields that are used in standards such as, for example, ID3v1, ID3v2, ID3v2.3.0, and so forth, as well as other fields that are created by other parties, by users, by content providers, and so forth. As indicated above, it is also recognized that in other embodiments, the metadata database 232 may manage other types of content data and/or metadata.

In one embodiment, the metadata database 232 includes the metadata as well as the content data. For example, the metadata database 232 may include the audio files as well as the metadata that corresponds to the audio files. In another embodiment, the content data may be stored in a different database and/or only a subset of the content data may be stored in the metadata database 232. It is recognized that the metadata database 232 may be implemented as several separate databases.

2. Tree Information Database

The tree information database 234 includes data about the trees within the master tree 122. This information may include tree types, groupings, node names, node locations, and so forth. For example, the tree information database may include grouping tables that include data about the grouping tree structure wherein the grouping tables include information such as, for example, the names of the nodes, the relationship between nodes, whether the node is a standard node or customized node, and so forth. In addition, the tree information database 234 may include playlist tables that define the various playlists and include information about the playlists such as, for example, data/time created, name of the creator, and so forth. The tree information database 234 may also include node location tables that define the location of nodes in the subtrees and/or the master tree 122.

It is recognized that the tree information database 234 may include other types of information as well. In addition, in other embodiments, the tree information database 234 may be implemented as several separate databases.

3. Additional Embodiments

The database collection 230 may also include other databases (not shown) for performing various management tasks. For example, the database collection 230 may include a user preferences database that includes information on the types of audio content and metadata that the user prefers and/or the user's favorite web sites for downloading audio content and metadata.

In connection with the database collection 230, in one embodiment, there may be several processes (not shown) such as ID generators, number generators, statistic generators, session generators, and temp storage units that work with the database collection 230.

In one embodiment, the database collection 230 is implemented using CodeBase, a semi-relational database offered by Sequiter. CodeBase is a high-speed xBase-compatible database engine that works with C/C++, Visual Basic, Delphi and Java under standalone and client/server environments. It is recognized that the database collection 230 may be implemented using a different type of relational database, such as Sybase, Oracle, Microsoft® SQL Server, and so forth as well as other types of databases such as, for example, a flat file database, an entity-relationship database, and object-oriented database, a record-based database, and so forth.

Moreover, while the database collection 230 depicted in FIG. 2 is comprised of several separate databases, it is recognized that in other embodiments, the database collection 230 may contain other databases or some of the databases may be omitted and/or combined. In addition, the database collection 230 may be implemented as a single database with separate tables or as other data structures that are well know in the art such as linked lists, binary trees, and so forth.

In one embodiment, the database collection 230 may be connected to a backend component (not shown) that receives database requests via servlets, small programs that run on servers, and sends a corresponding request to the database collection 230. It is recognized that in other embodiments data access may be performed differently, for example, a different type of backend component may be used, or the database collection 230 may be accessed directly.

IV. Metadata Management Module Processes

The metadata management module 210 illustrated in FIG. 2 includes a build process 212, an add node location process 214, a data change process 216, and an add metadata process 218.

A. Build Process

The build process 212 is used to dynamically build a grouping tree that represents a grouping wherein the grouping is a category or a set of categories by which the data may be grouped. For example, one grouping may be Artist while another grouping may be Genre/Artist, and yet another grouping may be Genre/Artist/Album.

For example, Table 1 represents a sample set of audio metadata.

TABLE 1

| Track Name | Artist | Album | Genre | Length |
|---|---|---|---|---|
| Always | B | XXX | Funk | 2:34:35 |
| Bird | A | YYY | Pop | 1:56:22 |
| Rhythm | C | YYY | Pop | 3:21:48 |
| Speed | A | ZZZ | Rock | 2:15:03 |

The field names are located in the first row and represent categories, and the metadata information, also referred to as a category value, is shown in the subsequent rows. For example, the category Track Name has four different category values: Always, Bird, Rhythm, and Speed; and the category Artist has three different category values: A, B, and C.

A tree based on the grouping "Artist" for the data in Table 1 may look like the following, wherein the grouping is "Artist" that includes one category, Artist:

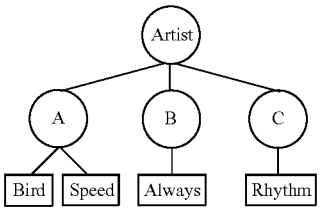

The circles represent categories from the groupings and the squares represent the audio track records which are the leaf nodes of the tree. The top node (or root note of this grouping) represents the grouping name. The next level of nodes represents the category values for the category Artist category. The leaf nodes represent the audio track records (and/or a reference to the records).

To further illustrate, a tree based on the grouping "Genre/Artist" for the data in Table 1 may look like the following, wherein the grouping is "Genre/Artist" that includes two categories, first Genre and second Artist:

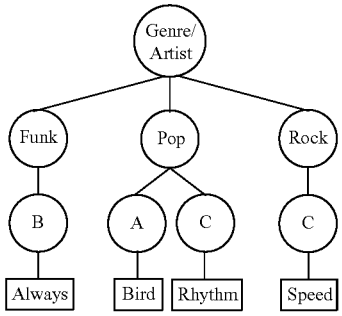

The root node represents the grouping name. The next level of nodes under the root node represent the category values for the Genre category and the next level of nodes represent the category values for the Artist category. The leaf nodes represent the audio track records (and/or a reference to the records).

In the next example, a tree based on the grouping "Genre/Artist/Album" for the data in Table 1 may look like the following, wherein the grouping is "Genre/Artist/Album" that includes three categories, first Genre, second Artist, and third Album:

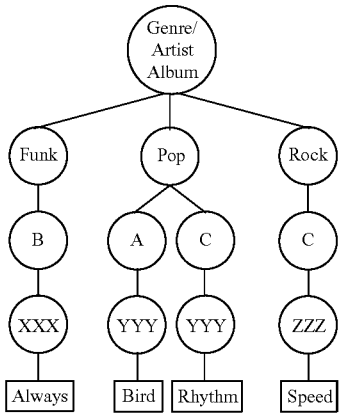

The root node represents the grouping name. The next level of nodes under the root node represent the category values for the Genre category; the next level of nodes represent the category values for the Artist category; the third level of nodes represent the category values for the Album category. The leaf nodes represent the audio track records (and/or a reference to the records).

Figure 3:
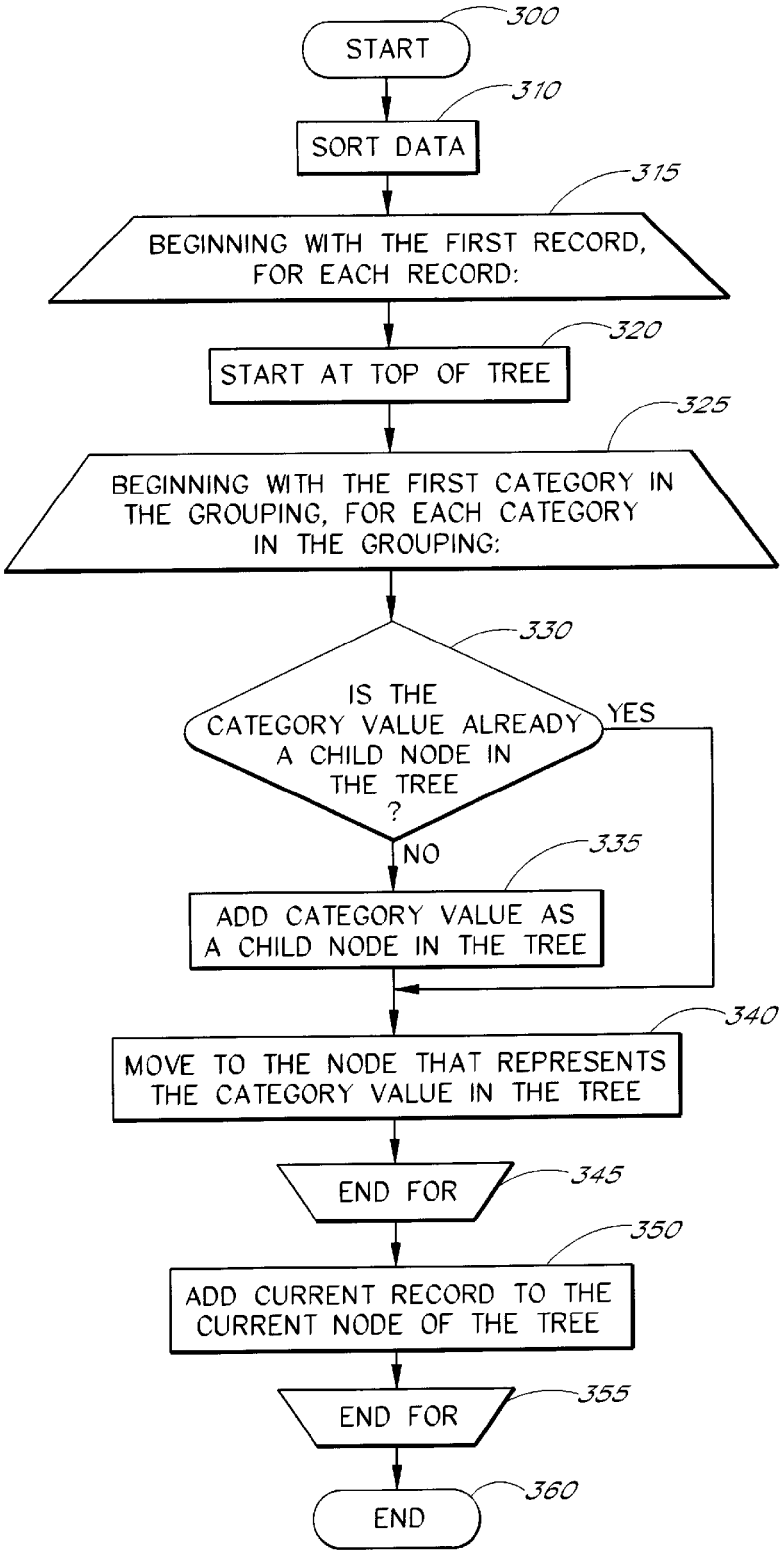
FIG. 3 illustrates a flowchart of one embodiment of building a tree grouping.

One embodiment of a build process 212 will now be described with reference to FIG. 3, though it is recognized that a variety of methods may be used to implement the build tree process.

The build process 212 begins at a start state 300 and then proceeds to a state 310. In state 310, the build process 212 sorts the data by the first category in the grouping, then by the second category in the grouping, and so forth for each category in the grouping and then proceeds to a state 315. In state 315, beginning with the first record of the sorted data, and continuing until all of the records have been traversed (states 315 and 355), the build process 212 proceeds to a state 320. In state 320, the build process 212 creates a grouping name node as the top of the tree and moves the current location to the top of the tree. Proceeding to a state 325, beginning with the first category in the grouping, and continuing until all of the categories in the grouping have been traversed (states 325 and 345), the build process 212 proceeds to a state 330. In state 330, the build process 212 determines if the category value is already a child node in the tree. If the category value for the current record is not already a child node in the current location of the tree, the build process 212 proceeds to a state 335 and adds the category value as a child node in the current location of the tree and proceeds to a state 340. If the category is already a child node in the current location of the tree, the build process 212 proceeds to state 340. In state 340, the build process 212 moves the current location to the node that represents the category value and proceeds to a state 345. In state 345, the build process 212 returns to state 325 if there are any more categories in the grouping. Once all of the categories in the grouping have been traversed (states 325 and 345), the build process 212 proceeds to a state 350. In state 350, the build process 212 adds the current record to the current node of the tree and proceeds to a state 355. In state 355, the build process 212 returns to state 315 if there are any more records that have not been traversed. Once all of the records have been traversed, the build process 212 proceeds to an end state 360.

As indicated above, it is recognized that other methods of building a grouping tree may also be used. In addition, various methods for improving efficiency may also be used using tools such as recursion and other data management tools that are well-known to those skilled in the art. For example, the build process 212 may build the entire tree first without leaf nodes before adding any of the records. In addition, the build process 212 may recursively add nodes down one path of a tree and then add all records that fall within that path before moving onto the next path of the tree.

It is recognized that the various grouping trees may be combined to form a groupings tree 124, such as, for example, by creating a root node and attaching each of the grouping trees to the root node as a child node. A sample groupings tree 124 that corresponds to the data in Table 1 includes the grouping tree "Artist," the grouping tree "Genre/Artist," and the grouping tree "Genre/Artist/Album" may look like the following:

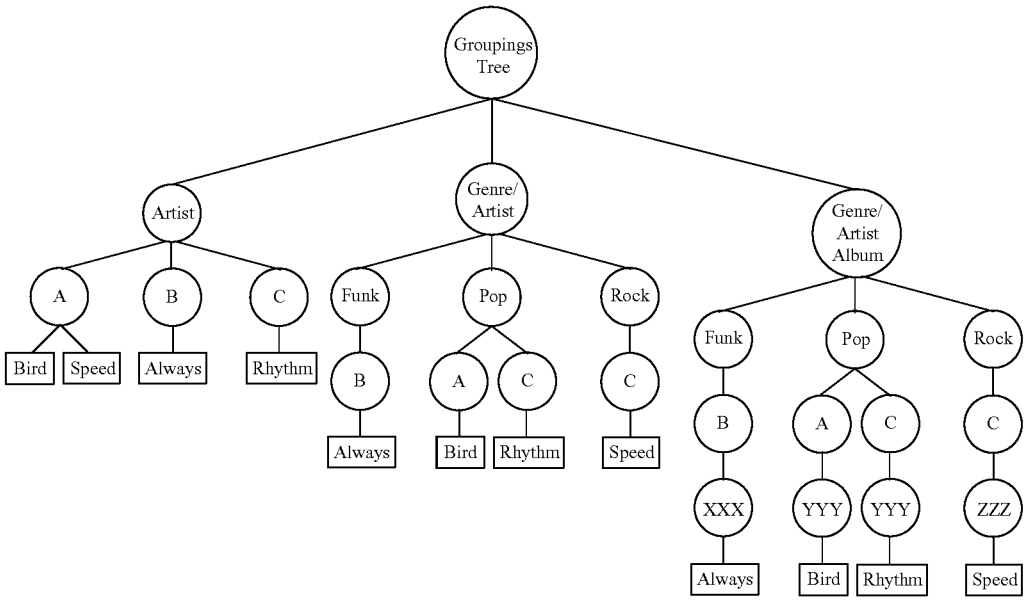

B. Add Node Location Process

The add node location process 214 is used to track the various locations of nodes in the master tree 122. In one embodiment, as the leaf-nodes are being added to any of the trees to be displayed in the tree window 120, the metadata management module 210 tracks the various locations in which the node is located and stores the data in the tree information database 234. As indicated above, the master tree 122 is preferably an acyclic graph that allows nodes to have multiple parent nodes. Thus, each time a node is added to a tree, the metadata management module 210 tracks and stores the node's location information in a data structure, such as a node location table, though it is recognized that a variety of data structures may be used such as, for example, a list, a tree, an array, a database, and so forth. The node location table may then be stored in the tree information database 234.

Table 2 illustrates a sample node location table that corresponds to the node locations of the example nodes used in the Build Process section above based upon the sample data of Table 1.

TABLE 2

| Node | Location 1 | Location 2 | Location 3 |
|---|---|---|---|
| Always | Artist-B | Genre/Artist-Funk-B | Genre/Artist/Album-Funk-B-XXX |
| Bird | Artist-A | Genre/Artist-Pop-A | Genre/Artist/Album-Pop-A-YYY |
| Rhythm | Artist-C | Genre/Artist-Pop-C | Genre/Artist/Album-Pop-C-YYY |
| Speed | Artist-A | Genre/Artist-Rock-C | Genre/Artist/Album-Rock-C-ZZZ |

While Table 2 includes only three locations, it is recognized that in other embodiments, the node location table may include N locations where N is a positive integer. In addition, some nodes may have more locations than others. For example, if the node Speed is in two of the user's playlists and Always is not in the user's playlists, then Speed may have two more locations than Always.

Figure 4:
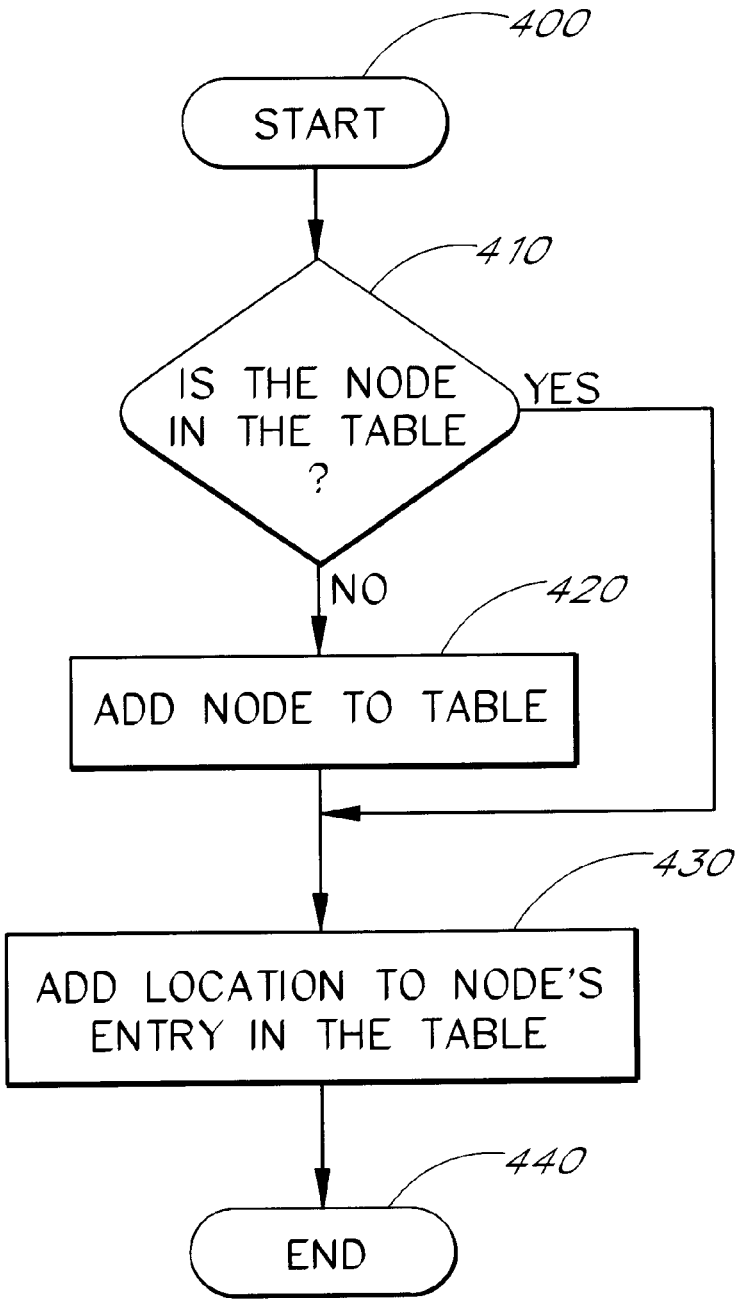
FIG. 4 illustrates a flowchart of one embodiment of adding an entry to the node location table.

One embodiment of an add node location process 214 will now be described with reference to FIG. 4, though it is recognized that a variety of methods may be used to implement an add node location process 214. In one embodiment, the add node location process 214 is executed each time a node is added to any of the trees in the master tree 122.

The add node location process 214 begins at a start state 400 and then proceeds to a state 410. In state 410, the add node location process 214 determines whether the node exists in the node location table. If the node does not exist in the node location table, the add node location process 214 adds the node to the node location table in state 420 and proceeds to a state 430. If the node already exists in the node location table, then the node location process proceeds to state 430. In state 430, the add node location process 214 adds the current location of the node to the node's first empty location field in the node location table and proceeds to an end state 440.

C. Data Change Process

Figure 5:
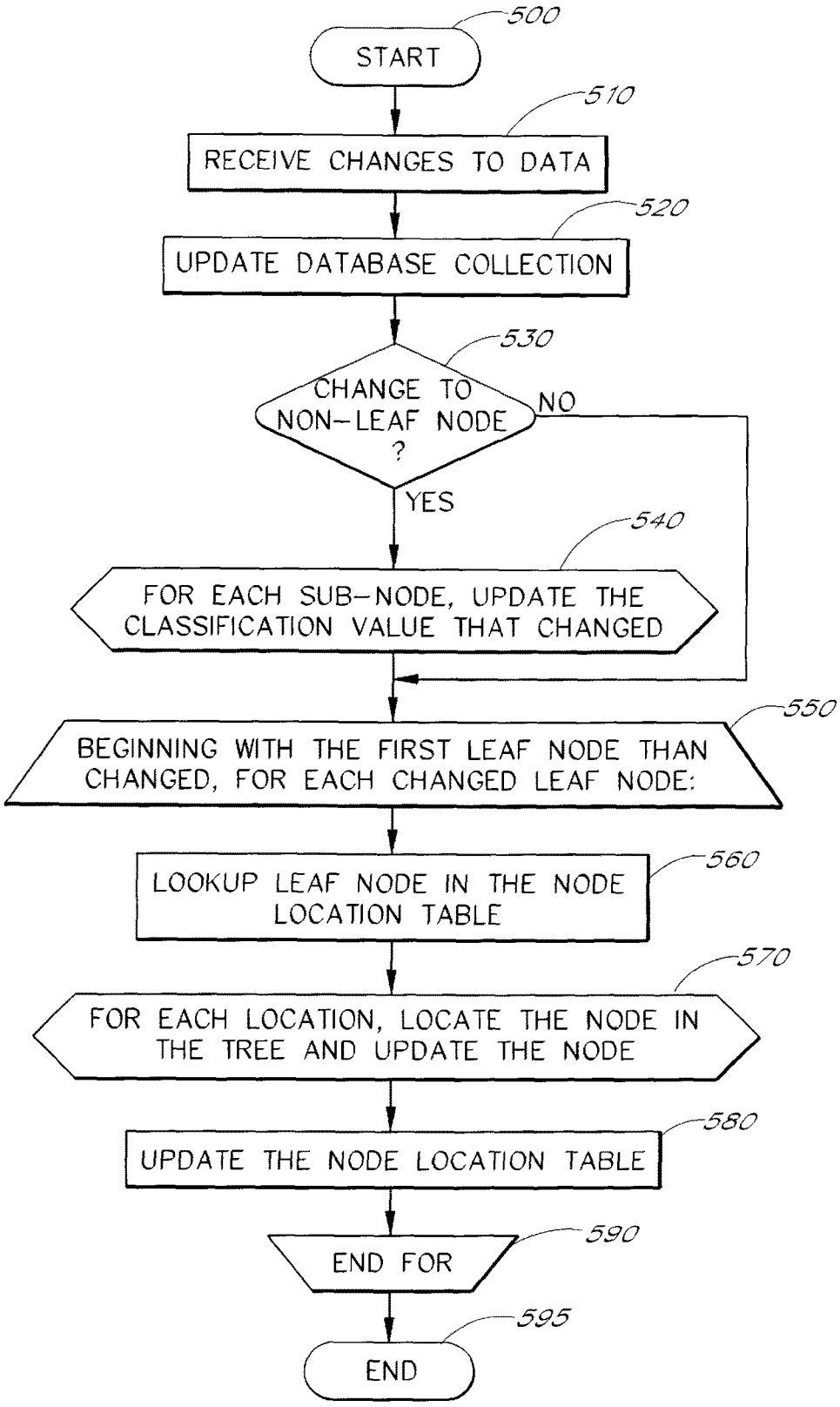
FIG. 5 illustrates a flowchart of one embodiment of processing a data change.

The data change process 216 is used to dynamically integrate changes into the database collection 230 as well as the master tree 122 and/or the node table 132. As indicated above, the user has access to add, change, or delete data in the tree window 120 and/or the table window 130 and the metadata management module 210 dynamically updates the master tree 122 and the node table 132 to reflect the user's additions, changes, and/or deletions. One embodiment of a data change process 216 is illustrated in FIG. 5.

Beginning at a start state 500, the data change process 216 proceeds to a state 510. In state 510, the data change process 216 receives a user's changes to data. For example, a user may reclassify a song from the genre Jazz to the genre New Age by using a mouse to drag the song from the Jazz node to the New Age node. In another example, a user may change the value of a grouping (e.g., rename a grouping) by selecting the grouping and typing in a new value. The user may also create a new playlist by selecting one or more audio tracks and copying them into a playlist node. The user may make the changes using various actions such as, for example, typing and changing any of the fields of information, dragging and dropping one of the nodes into a different grouping, adding a new grouping using the menu system, and so forth. When a user drags, one node to a different grouping, the node will then inherit the characteristics of the new grouping (i.e., be reclassified), and the metadata database 232 will be updated accordingly. For example, if the audio track entitled "Always" was located under the Genre/Artist grouping Funk→B and the user moved it to Pop→A, the Genre value of the "Always" track may be updated to Pop and the Artist value may be updated to B.

The data change process 216 then proceeds to a state 520. In state 520, the data change process 216 updates the database collection 230 (e.g., the metadata database 232 and/or the tree information database 234) with the changes and proceeds to a state 530. In state 530, the data change process 216 determines whether the change was made to a leaf node or a non-leaf node. If the change was made to a non-leaf node, then the data change process 216 proceeds to state 540 wherein for each sub-node (e.g. children, grandchildren, and so forth) of the non-leaf node, the data change process 216 updates the classification or field value that changed and proceeds to a state 550. If the change was made to a leaf node, then the data change process 216 proceeds to state 550. In state 550, beginning with the first leaf node that was changed, and continuing until all of the leaf nodes that were changed (states 550 and 590) are processed, the data change process 216 proceeds to a state 560. In state 560, the data change process 216 looks up the leaf node in the node location table and proceeds to a state 570. In state 570, for each location in the node location table entry, the data change process 216 locates the node in the master tree 122, updates the node and proceeds to a state 580. In state 580, the data change process 216 updates the node location table to reflect any location changes and proceeds to a state 590. In state 590, the data change process 216 returns to state 550 if there are more changed leaf nodes that have not been updated. Once all of the changed leaf nodes have been updated, the data change process 216 proceeds to an end state 595.

It is recognized that in other embodiments, the data change process 216 may be implemented in a different manner. For example, the node location table may be limited to include only those nodes that are displayed in the graphical user interface 220 such that the data change process 216 updates only those nodes that are being displayed in the graphical user interface 220. In other embodiments, the data change process 216 may be implemented without using a node location table.

Figure 6:
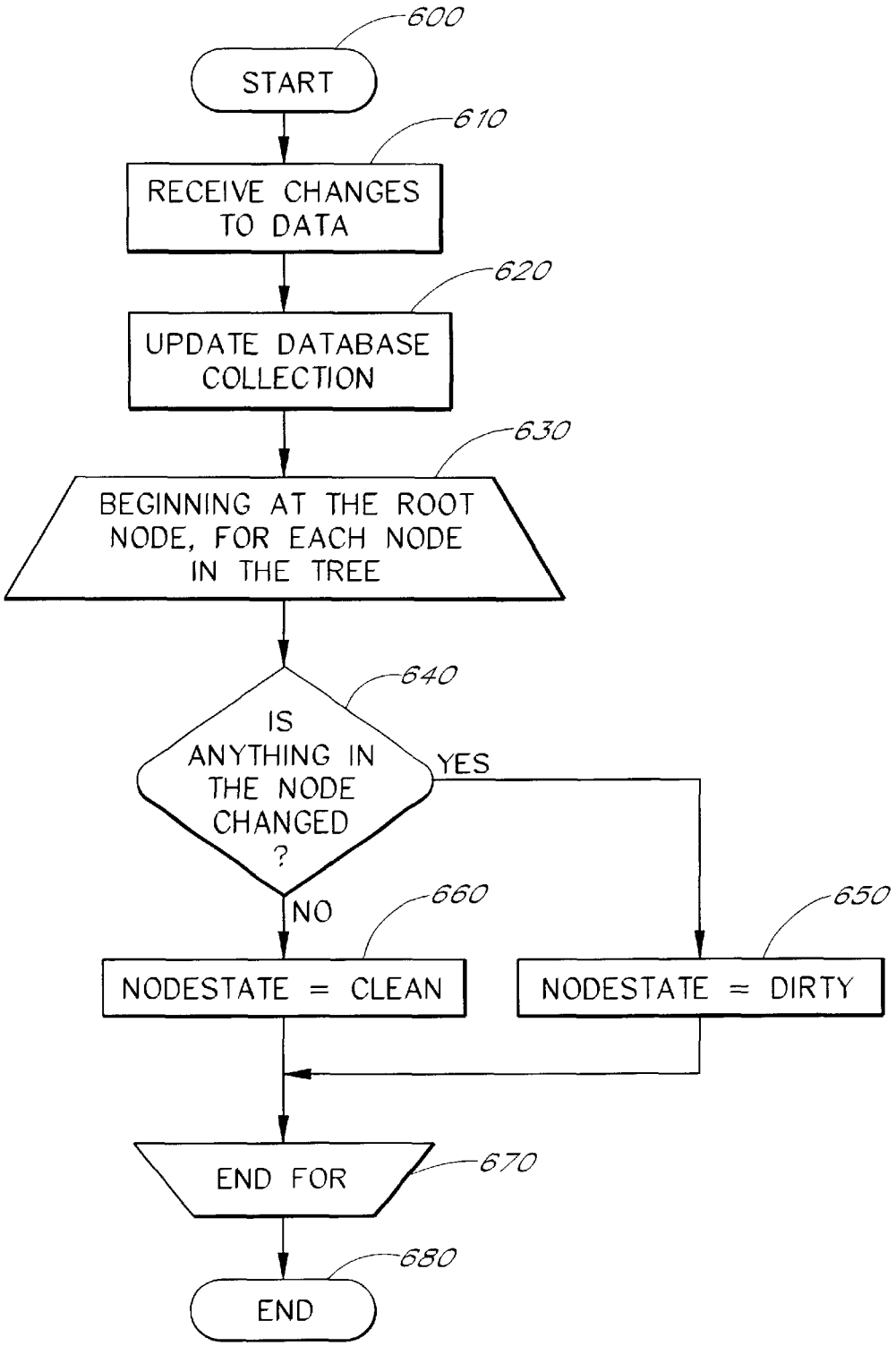
FIG. 6 illustrates a flowchart of one embodiment of processing a data change.

An additional embodiment of the data change process 216 is illustrated in FIG. 6. Beginning at a start state 600 the data change process 216 proceeds to a state 610. In state 610, the data change process 216 receives a user's changes to data and proceeds to a state 620. In state 620, the data change process 216 updates the database collection 230 (e.g., the metadata database 232 and/or the tree information database 234) with the changes and proceeds to a state 630. In state 630, beginning with the root node, and continuing until all of the nodes in the tree (states 630 and 670) are traversed, the data change process 216 proceeds to a state 640. In state 640, the data change process determines whether anything in the node has been changed. If anything in the node has been changed, the data change process proceeds to a state 650 wherein a Node State is set to DIRTY, and proceeds to a state 670. If the node has not been changed, the data change process proceeds to a state 660 wherein the Node State is set to CLEAN, and proceeds to state 670. In state 670, the data change process 216 returns to state 630 if there are nodes that have not been traversed. Once all of the nodes have been traversed, the data change process 216 proceeds to an end state 680. Thus, at then end of the process, each node in the tree has been marked as DIRTY or CLEAN. The next time the node is accessed, (e.g., selected by the user), then the node is regenerated to reflect the changes, and the changes are recursively propagated to any of the accessed node's sub-nodes.

It is recognized that in other embodiments, the data change process 216 may be implemented in a different manner. For example, additional, fewer, and/or different states may be used to track the changes to the nodes; a non-recursive process may be implemented; each node in the tree may be regenerated before the node is accessed; and so forth.

It is also recognized that the leaf-nodes may contain references to leaf node data such that when the leaf node data is changed, the changes may be automatically propagated to the other locations in which the leaf node resides.

D. Add Metadata Process

The add metadata process 218 is used to find and add metadata to the metadata database 232. In one embodiment, the add metadata process 218 is triggered if there is no information in the metadata database 232 for an audio track. In other embodiments, the add metadata process 218 may be triggered if there is information in the metadata database 232 for an audio track, but certain portions of the information is missing. In such embodiments, when new data is found that includes data that conflicts with the existing data, the add metadata process 218 may default to overwriting the old data, keeping the old data, keeping the old data only if the user had edited the data, or use other defaults.

Figure 7:
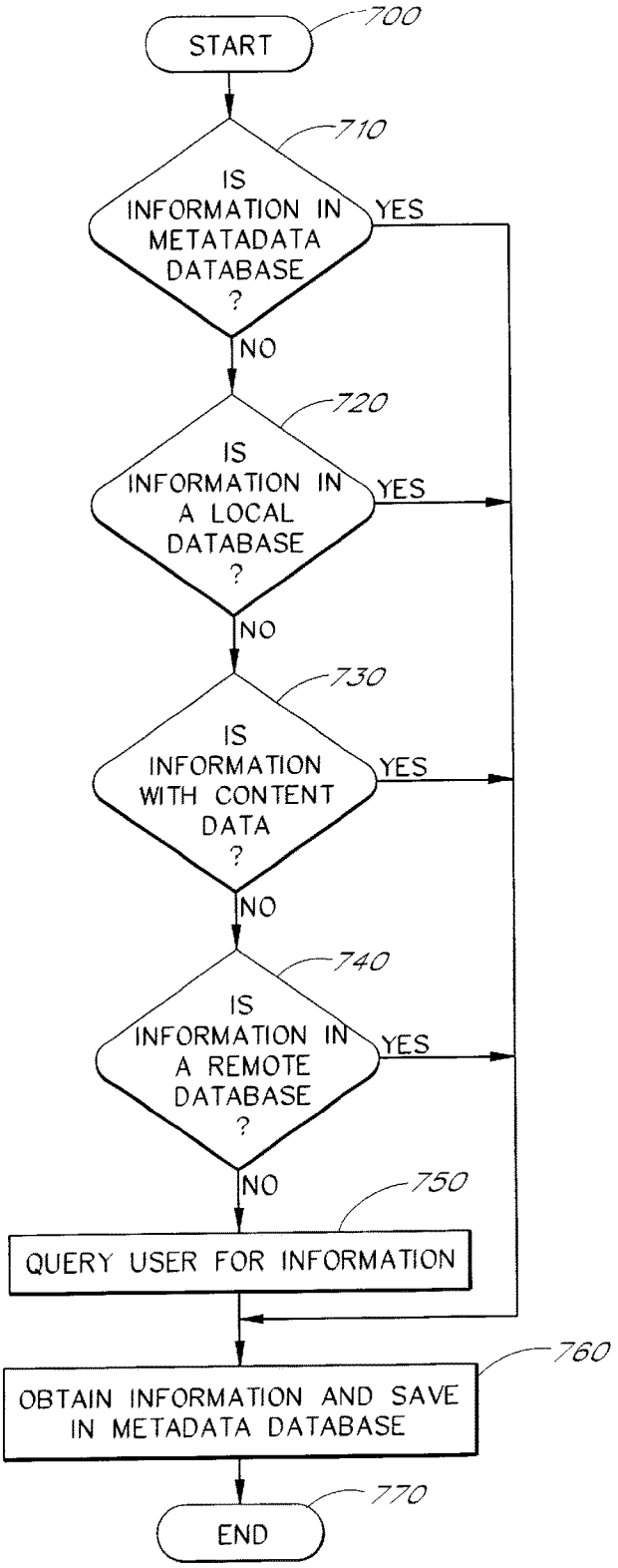
FIG. 7 illustrates a flowchart of one embodiment of adding metadata.

One embodiment of an add metadata process 218 is illustrated in FIG. 7. The embodiment depicted in FIG. 7 looks for data if there is no information in the metadata database 232 for a track and thus, there are no conflicts. As previously indicated, it is recognized that an add metadata process 218 may be implemented using other defaults.

Beginning at a start state 700, the add metadata process 218 proceeds to a state 710. In state 710, the add metadata process 218 determines whether there is information for the designated track in the metadata database 232. The track may be designated using a variety of methods such as, for example, by placing a CD in the CD-ROM drive, by having the user select a group of tracks, by preselecting a group of tracks, and so forth. If there is already information for the designated track in the metadata database 232, the add metadata process 218 proceeds to an end state 770. If the information is not already in the metadata database 232, the add metadata process 218 proceeds to a state 720. In state 720, the add metadata process 218 determines whether the information is located in a local database. The local database may be, for example the CDPlayer.ini file as well as any other database or file of metadata that may be stored on or accessed by the add metadata process 218. If the information is in a local database, the add metadata process 218 proceeds to a state 760 wherein the add metadata process 218 obtains a copy of the information and saves the information in the metadata database 232 and proceeds to the end state 770. If the information is not in the local database, the add metadata process 218 proceeds to a state 730. In state 730, the add metadata process 218 determines whether the information is located with the content data. For example, if the content data is stored on a CD-ROM, then CD-ROM is checked for metadata information. If the content data is stored in an encoded data file such as, for example an MP3 file, the encoded data file is checked for metadata information. If the information is with the content data, the add metadata process 218 proceeds to a state 760 wherein the add metadata process 218 obtains a copy of the information and saves the information in the metadata database 232 and proceeds to the end state 770. If the information is not with the content data, the add metadata process 218 proceeds to a state 740. In state 740, the add metadata process 218 determines whether the information is located in a remote database. For example, the adding data process may contact a remote database of audio metadata and perform a lookup of the designated track(s) to look for and retrieve the corresponding metadata. The corresponding metadata may then be sent to the add metadata process 218. The contact with the remote database may be through a variety of mediums such as, for example, a direct network connection, a dial-up connection, an internet connection, and so forth. If the information is in the remote database, the add metadata process 218 proceeds to a state 760 wherein the add metadata process 218 obtains a copy of the information and saves the information in the metadata database 232 and proceeds to the end state 770. If the information is not in the remote database, the add metadata process 218 proceeds to a state 750. In state 750, the add metadata process 218 queries the user for the information and the add metadata process 218 proceeds to a state 760 wherein the add metadata process 218 obtains a copy of the entered information, saves the information in the metadata database 232, and proceeds to the end state 770.

In one embodiment, the graphical user interface 220 may also be updated each time the metadata database 232 is updated. In addition, it is recognized that a subset of the various checks for data described above may be used. For example, in one embodiment, the add metadata process 218 may only look in a local database and a remote database.

In another embodiment, metadata information may also be added by user-initiated actions. For example, a user may drag and drop a set of metadata information the user received in an e-mail or on a disk into the graphical user interface 220. Furthermore, the user may also initiate the add metadata process 218 wherein the user requests to be queried for information about the metadata. In other embodiments, metadata information may also be added by other processes. For example, if a user downloads a file, the download process may automatically import metadata information into the metadata database 232. In another example, when the user updates the audio playing program, audio playing program may automatically trigger a lookup of any missing metadata information.

V. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

[1. In a user computer, a method comprising:

generating a graphical representation of a plurality of metadata database entries corresponding to, audio/video content to be played by a media player application, each metadata entry stored locally at the user computer in the metadata database and characterized in accordance with a plurality of attributes that are associated with the audio/video content and shared between one or more of the plurality of metadata database entries;

receiving user input to manually modify one of the shared attributes;

recharacterizing in the metadata database, those of the plurality of metadata database entries characterized by the modified one of the shared attributes; and dynamically updating the graphical representation of the one or more of the plurality of metadata database entries based upon the user input.]

[2. The method of claim 1, wherein the audio/video content is played by the media player application in response to a metadata entry being selected by the user.]

[3. The method of claim 1, wherein the user may manually perform at least one of a metadata addition, metadata deletion, and a metadata modification via the graphical representation.]

[4. The method of claim 1, wherein the audio/video content comprises an MP3 file.]

[5. The method of claim 1, wherein the metadata database is stored separate from the audio/video content.]

[6. The method of claim 1, wherein the graphical representation further comprises a plurality of content grouping trees, each representing one or more of the plurality of metadata database entries and characterized in accordance with at least a first of the one or more attributes.]

[7. The method of 6, wherein the graphical representation further comprises a table including metadata entries corresponding to nodes of a selected one of the plurality of content grouping trees.]

[8. The method of 7, wherein the table includes metadata entries corresponding to leaf nodes of the selected one of the plurality of content grouping trees.]

[9. The method of 6, wherein the plurality of content grouping trees comprises a hierarchical folder structure.]

[10. The method of 9, wherein the plurality of content grouping trees comprises a hierarchical folder structure wherein the hierarchical folder structure is selectively expandable based upon user input.]

[11. The method of claim 1, wherein the graphical representation further comprises a table including metadata entries characterized in accordance with at least a subset of the plurality of attributes associated with the audio/video content.]

[12. The method of claim 1, wherein the metadata database is a hierarchically arranged database containing the plurality of metadata database entries corresponding to a plurality of audio/video content.]

[13. The method of claim 1, wherein the attributes associated with the audio/video content comprise a selected one of a title, artist, genre, and track name.]

[14. In a user computer, a method comprising:

generating a graphical representation of a plurality of metadata entries characterizing audio/video content to be played by a media player application, wherein the metadata is stored locally at the user computer in a metadata database and characterized in accordance with one or more attributes associated with the audio/video content, the graphical representation including a plurality of content grouping trees, with each content grouping tree representing one or more metadata entries characterized in accordance with a first of the one or more attributes; and a table including metadata entries corresponding to nodes of a selected one of the plurality of content grouping trees;

receiving user input to manually modify at least one of the attributes associated with the audio/video content; and dynamically updating the graphical representation of the metadata and the metadata database to reflect the user input.]

[15. The method of claim 14, wherein a user may recharacterize a metadata entry by graphically associating the metadata entry displayed in the table with a second content grouping tree corresponding to a second of the one or more attributes.]

[16. The method of claim 15, wherein the metadata entry inherits characteristics associated with the second content grouping tree.]

[17. The method of claim 14, wherein the table comprises a plurality of attribute field names including at least one of track name, artist, album, genre and track length.]

[18. The method of claim 14, wherein the audio/video content is played by the media player application in response to a metadata entry being selected by the user.]

[19. The method of claim 14, wherein the user may manually perform at least one of a metadata addition, metadata deletion, and a metadata modification via the graphical representation.]

[20. The method of claim 14, wherein the audio/video content comprises an MP3 file.]

[21. The method of claim 14, wherein the table includes metadata entries corresponding to leaf nodes of a selected one of the plurality of content grouping trees.]

[22. An apparatus comprising:

a storage medium having a plurality of programming instructions stored therein, the programming instructions designed to generate a graphical representation of a plurality of metadata database entries corresponding to, audio/video content to be played by a media player application, each metadata entry stored locally in the metadata database and characterized in accordance with a plurality of attributes that are associated with the audio/video content and shared between one or more of the plurality of metadata database entries, receive user input to manually modify one of the shared attributes, recharacterize in the metadata database, those of the plurality of metadata database entries characterized by the modified one of the shared attributes, and dynamically update the graphical representation of the one or more of the plurality of metadata database entries based upon the user input; and at least one processor coupled with the storage medium to execute the programming instructions.]

[23. The apparatus of claim 22, wherein the programming instructions are further designed to play the audio/video content in response to a metadata entry being selected by the user.]

[24. The apparatus of claim 22, wherein the programming instructions are further designed to facilitate at least one of a metadata addition, metadata deletion, and a metadata modification by a user via the graphical representation.]

[25. The apparatus of claim 22, wherein the graphical representation further comprises a plurality of content grouping trees, each representing one or more of the plurality of metadata database entries and characterized in accordance with at least a first of the one or more attributes.]

[26. The apparatus of 25, wherein the graphical representation further comprises a table including metadata entries corresponding to nodes of a selected one of the plurality of content grouping trees.]

[27. The apparatus of 26, wherein the table includes metadata entries corresponding to leaf nodes of the selected one of the plurality of content grouping trees.]

[28. The apparatus of 25, wherein the plurality of content grouping trees comprises a hierarchical folder structure.]

[29. The apparatus of 28, wherein the plurality of content grouping trees comprises a hierarchical folder structure wherein the hierarchical folder structure is selectively expandable based upon user input.]

[30. The apparatus of claim 22, wherein the graphical representation further comprises a table including metadata entries characterized in accordance with at least a subset of the plurality of attributes associated with the audio/video content.]

[31. The apparatus of claim 22, wherein the metadata database is a hierarchically arranged database containing the plurality of metadata database entries corresponding to a plurality of audio/video content.]

[32. The apparatus of claim 22, wherein the attributes associated with the audio/video content comprise a selected one of a title, artist, genre, and track name.]

[33. An apparatus comprising:

a storage medium having a plurality of programming instructions stored therein, the programming instructions designed to generate a graphical representation of a plurality of metadata entries, characterizing audio/video content to be played, wherein the metadata is stored locally in a metadata database and characterized in accordance with one or more attributes associated with the audio/video content, the graphical representation including a plurality of content grouping trees, with each content grouping tree representing one or more metadata entries characterized in accordance with a first of the one or more attributes, and a table including metadata entries corresponding to nodes of a selected one of the plurality of content grouping trees, receive user input to manually modify at least one of the attributes associated with the content, and dynamically update the graphical representation of the metadata and the metadata database to reflect the user input; and at least one processor coupled with the storage medium to execute the programming instructions.]

[34. The apparatus of claim 33, wherein the programming instructions are further designed to facilitate a user in recharacterizing a metadata entry by graphically associating the metadata entry displayed in the table with a second content grouping tree corresponding to a second of the one or more attributes.]

[35. The apparatus of claim 33, wherein the table comprises a plurality of attribute field names including at least one of track name, artist, album, genre and track length.]

[36. The apparatus of claim 33, wherein the audio/video content comprises an MP3 file.]

[37. The apparatus of claim 33, wherein the programming instructions are further designed to play the audio/video content in response to a metadata entry being selected by the user.]

[38. The apparatus of claim 33, wherein the programming instructions are further designed to facilitate at least one of a metadata addition, metadata deletion, and a metadata modification by a user via the graphical representation.]

*39. A method of selecting at least one track from a plurality of tracks stored in a portable computing device executing a player module including at least one of an audio player and a video player, the portable computing device configured to present a hierarchical tree on a display of the portable computing device, the plurality of tracks accessed according to a hierarchy of the hierarchical tree, the hierarchy having a plurality of categories, subcategories, and items respectively in a first, second, and third level of the hierarchy, the method comprising:*

*receiving, using one or more processors, a selection of a category in the first level of the hierarchical tree on the portable computing device executing the player module including the at least one of an audio player and a video player;*

*displaying, using the one or more processors, the subcategories belonging to the selected category as child nodes of the selected category in a listing presented in the second level of the hierarchical tree;*

*receiving, using the one or more processors, a selection of a subcategory in the second level of the hierarchical tree;*

*displaying, using the one or more processors, the items belonging to the selected subcategory as child nodes of the selected subcategory in a listing presented in the third level of the hierarchical tree; and*

*accessing, using the one or more processors, at least one track based on a selection made in one of the levels of the hierarchical tree,*

*wherein receipt of the selection in the first level of the hierarchical tree results in an expansion of the hierarchical tree to display the child nodes of the selected category and receipt of the selection in the second level of the hierarchical tree results in an expansion of the hierarchical tree to display the child nodes of the selected subcategory.*

*40. The method of selecting a track as recited in claim 39 wherein the accessing at least one track comprises selecting an item in the third level of the hierarchical tree and playing at least one track associated with the selected item.*

*41. The method of selecting a track as recited in claim 39 wherein the accessing at least one track comprises one of playing or adding to a playlist at least one track associated with a selected one of the category, subcategory, and item.*

*42. The method of selecting a track as recited in claim 39 further comprising selecting one of the items displayed in the third level of the hierarchical tree and presenting a listing of items associated with the selected item as child nodes of the selected item in a fourth level of the hierarchical tree.*

*43. The method of selecting a track as recited in claim 39 wherein the category genre is selected in the first level of the hierarchical tree from available categories that include at least artist, album, and genre; and the subcategories listed in the second level of the hierarchical tree comprise a listing of at least one genre type and one of the at least one genre type is selected.*

*44. The method of selecting a track as recited in claim 39 wherein the track is a music track, accessing at least one track comprises accessing a track title in the third level of the hierarchical tree, and the track is played in response to the access.*

*45. The method of selecting a track as recited in claim 39 wherein the category selected in the first level of the hierarchical tree is from a top level of the hierarchy.*

*46. The method of selecting a track as recited in claim 39 wherein the category selected in the first level of the hierarchical tree is a category from a level at least one level below the top level of the hierarchy.*

*47. The method of selecting a track as recited in claim 39 wherein the plurality of categories comprise a list of artist names, the plurality of subcategories comprise a list of album names and the plurality of items comprise a list of track names.*

*48. The method of selecting a track as recited in claim 39 wherein the accessing at least one track comprises selecting a subcategory in the second level of the hierarchical tree and playing a plurality of tracks associated with the selected subcategory.*

*49. The method of selecting a track as recited in claim 39 wherein the accessing at least one track comprises selecting a subcategory and adding the tracks associated with the selected subcategory to a playlist.*

*50. The method of selecting a track as recited in claim 39 wherein the accessing at least one track comprises selecting an item in the third level of the hierarchical tree and adding at least one track associated with the selected item to a playlist.*

*51. The method of selecting a track as recited in claim 39 further comprising receiving user input to modify an attribute of at least one track of the corresponding tracks.*

*52. The method of selecting a track as recited in claim 51 further comprising updating a tree information database and a display of the hierarchical tree based on the received user input, the tree information database comprising data regarding the hierarchy of the hierarchical tree.*

*53. The method of selecting a track as recited in claim 39 further comprising updating a tree information database based on one or more added tracks, the tree information database comprising data regarding the hierarchy of the hierarchical tree.*

*54. The method of selecting a track as recited in claim 39 wherein the hierarchical tree and the hierarchy of the hierarchical tree are in the form of a directed acyclic graph.*

*55. A method of selecting at least one track from a plurality of tracks stored in a portable computing device executing a player module including at least one of an audio player and a video player, the portable computing device configured to present a hierarchical tree on a display of the portable computing device, the plurality of tracks accessed according to a hierarchy of the hierarchical tree, the hierarchy having a plurality of categories, subcategories, and items respectively in a first, second, and third level of the hierarchy, the method comprising causing one or more processors to:*

*receive a selection of a category in the first level of the hierarchical tree on the portable computing device executing the player module including the at least one of an audio player and a video player;*

*display the subcategories belonging to the selected category as child nodes of the selected category in a listing presented in the second level of the hierarchical tree;*

*receive a selection of a subcategory in the second level of the hierarchical tree;*

*display the items belonging to the selected subcategory as child nodes of the selected subcategory in a listing presented in the third level of the hierarchical tree;*

*access at least one track based on a selection made in one of the levels of the hierarchical tree;*

*receive user input to modify an attribute of at least one track of the corresponding tracks; and*

*update a tree information database and a display of the hierarchical tree based on the received user input, the tree information database comprising data regarding the hierarchy of the hierarchical tree.*

*56. A method of selecting at least one track from a plurality of tracks stored in a portable computing device executing a player module including at least one of an audio player and a video player, the portable computing device configured to present a hierarchical tree on a display of the portable computing device, the plurality of tracks accessed according to a hierarchy of the hierarchical tree, the hierarchy having a plurality of categories, subcategories, and items respectively in a first, second, and third level of the hierarchy, the method comprising:*

*receiving a selection of a category in the first level of the hierarchical tree on the portable computing device executing the player module including the at least one of an audio player and a video player;*

*displaying the subcategories belonging to the selected category as child nodes of the selected category in a listing presented in the second level of the hierarchical tree;*

*receiving a selection of a subcategory in the second level of the hierarchical tree;*

*displaying the items belonging to the selected subcategory as child nodes of the selected subcategory in a listing presented in the third level of the hierarchical tree;*

*accessing at least one track based on a selection made in one of the levels of the hierarchical tree; and*

*updating a tree information database based on one or more added tracks, the tree information database comprising data regarding the hierarchy of the hierarchical tree.*

* * * * *